United States Patent Office 3,652,657
Patented Mar. 28, 1972

3,652,657
ESTROGENIC AGENTS
John H. Fried, Palo Alto, and John A. Edwards and William McCrae, Los Altos, Calif., assignors to Syntex Corporation, Panama, Panama
No Drawing. Filed July 24, 1968, Ser. No. 747,083
Int. Cl. C07c 61/28, 61/32; C07d 9/00
U.S. Cl. 260—488 R
10 Claims

ABSTRACT OF THE DISCLOSURE

Novel 1,6-methano-, 1,6-dichloromethano-, 1,6-difluoromethano-, and 1,6-oxido-cyclodecapentaene alcohols, aldehydes and acids and derivatives having estrogenic activity.

---

This invention relates to novel cyclodecapentaene compounds of the following Formulas A and B:

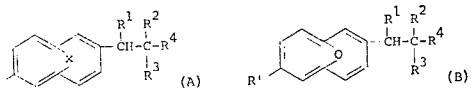

wherein,

R is hydrogen, lower alkoxy or lower carboxylic acyloxy;

R' is hydrogen or lower alkoxy;

Each of $R^1$, $R^2$ and $R^3$ is a lower alkyl group of one to three carbon atoms;

$R^4$ is —CHO, —$CH_2$—$R^5$, —$COOR^6$, —$CONH_2$, —CONHOH, —COF or —COCl in which $R^5$ is hydroxy of the hydrolyzable esters and ethers thereof and $R^6$ is hydrogen, lower alkyl or an alkali metal; and x is methylene, dichloromethylene or difluoromethylene.

The term "lower alkyl," unless otherwise specified, refers to a straight or branched saturated aliphatic hydrocarbon group containing from one to about six carbon atoms such as methyl, ethyl and isopropyl. The term "lower alkoxy" refers to a straight or branched alkoxy group containing from one to about six carbon atoms such as methoxy, ethoxy and propionoxy. The term "lower carboxylic acyloxy" refers to a carboxylic acyloxy group containing up to about eight carbon atoms of a straight, branched or cyclic chain structure derived from carboxylic anhydrides such as acetic anhydride, trifluoroacetic anhydride, propionic anhydride, n-caproic anhydride, benzoic anhydride, heptoic anhydride, acetic propionic anhydride, maleic anhydride, phenylacetic anhydride, p-methoxybenzoic anhydride, trimethylacetic anhydride, butyric anhydride, and the like, preferably lower alkanoic anhydrides of up to 12 carbon atoms. The expression "hydrolyzable esters and ethers," as used herein, refers to those physiologically acceptable hydrolyzable ester groups and labile ether groups conventionally employed in the pharmaceutical art such as acetate, propionate, butyrate, trimethylacetate, valerate, methylethylacetate, caproate, t-butylacetate, 3-methylpentanoate, enanthate, caprylate, triethylacetate, pelargonate, decanoate, undecanoate, benzoate, phenylacetate, diphenylacetate, cyclopentylpropionate, methoxyacetate, aminoacetate, diethylaminoacetate, trichloroacetate, β-chloropropionate, bicyclo[2.2.2]octane-1'-carboxylate, adamantoate, dihydrogen phosphate, dibenzyl phosphate, sodium ethyl phosphate, sodium sulfate, sulfate, tetrahydropyran-2'-yl ether, tetrahydrofuran-2'-yl ether, 4'-methoxytetrahydropyran-4'-yl ether, and the like.

The compounds of the present invention of Formula A can be prepared according to the following outlined process wherein R, $R^1$, $R^2$, $R^3$ and $x$ are as defined above and $R^7$ is bromo or chloro.

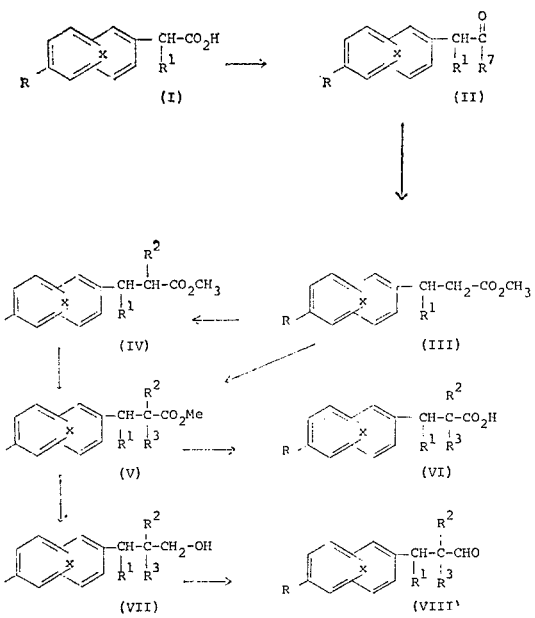

In the practice of the above outlined reactions, a 2-(cyclodecapentaen-3'-yl)propionic acid, butyric acid, or pentanoic acid of Formula I is reacted with triphenylphosphine dibromide or dichloride using the procedure of H. J. Bestmann et al., Annalen Der Chemie, 693, 132 (1966) to obtain the corresponding acid halide (II) which is treated with diazomethane according to the Arndt-Eistert reaction [see Wiberg et al., Journal of the American Chemical Society, 78, 1640 (1956) and Wilds et al., Journal of Organic Chemistry, 13, 763 (1948)] to afford the methyl ester of a 3-(cyclodecapentaen-3'-yl)butyric acid, pentanoic acid or hexanoic acid of Formula III. An acid chloride or bromide of Formula II can also be obtained by treatment with thionyl chloride or bromide in a hydrocarbon solvent such as benzene or oxalyl chloride or bromide in benzene. A compound of Formula III is treated with a lower alkyl halide containing one to three carbon atoms such as methyl iodide, ethyl iodide, propyl iodide or methyl bromide in the presence of an alklai metal hydride such as sodium hydride in dimethylformamide, tetrahydrofuran, or the like, to obtain a compound of Formula IV or V. By using a molar excess or more of a lower alkyl halide, a compound of Formula V is obtained in which the alkyl groups $R^2$ and $R^3$ are the same. By carrying out the alkylation procedure in two steps using one molar equivalent of a lower alkyl halide in each step, a compound of Formula V in which $R^2$ and $R^3$ represent different alkyl groups is obtained. A compound of Formula V, by treatment with base, e.g. an alkali metal hydroxide or carbonate, in a lower alcohol such as methanol affords the acid (VI). A compound of Formula V can be reduced using lithium aluminum hydride, or the like, in tetrahydrofuran to furnish the novel alcohols of Formula VII, which upon oxidation using chromium trioxide in pyridine, Jones reagent, or the like, affords the aldehydes of Formula VIII. Compounds of Formula VII and VIII in which R is a lower carboxylic acyloxy are preferably obtained by first converting the free acid (VI) into the corresponding acid chloride which is then reduced using one equivalent of lithium tri-t-butoxy aluminum hydride to the aldehyde (VIII). The aldehyde (VIII) is then reduced to the alcohol (VI) using one equivalent of lithium tri-t-butoxy aluminum hydride.

The compounds of the present invention of Formula B can be prepared according to the following outlined procedure wherein R', R¹, R² and R³ are as defined above and R⁴' is lower alkyl.

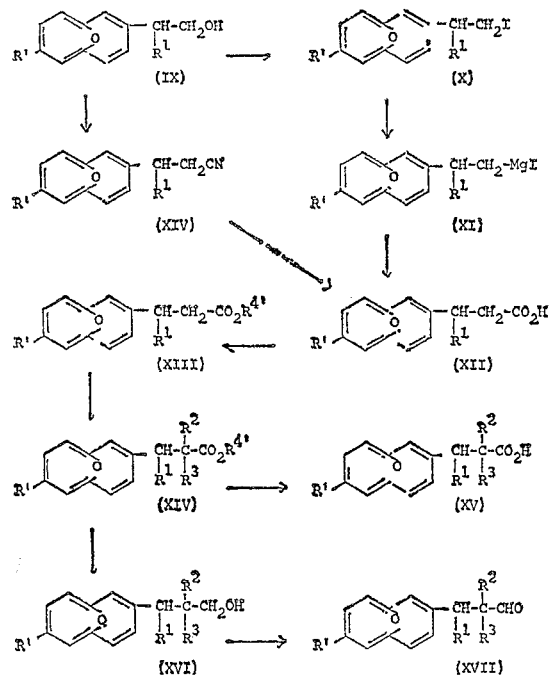

In the practice of the above reactions, an alcohol of Formula IX is converted into the corresponding tosylate by treatment with p-toluenesulfonyl chloride in pyridine which is treated with an alkali metal iodide such as sodium iodide in methyl ethyl ketone to obtain the iodide of Formula X. A compound of Formula X is treated with magnesium in ether solvent such as tetrahydrofuran to obtain a Grignard of Formula XI which is treated with dry carbon dioxide to afford an acid of Formula XII. By treatment with ethereal diazoalkane such as diazomethane, an acid of Formula XII is converted into the corresponding lower alkyl ester (XIII) which is alkylated using a lower alkyl halide and an alkali metal hydride according to the procedure described above to afford compounds of Formula XIV in which the alkyl groups R² and R³ are the same or different. An alkyl ester of Formula XIV is then hydrolyzed to afford the free acid (XV) or subjected to reduction to obtain the alcohol (XVI) which can be oxidized to the aldehyde (XVII) using an N,N'-dialkylcarbodiimide or N,N'-dicycloalkylcarbodiimide and dimethyl sulfoxide, or the like.

In the reaction sequence of IX→XIV→XII, an alcohol of Formula IX is first converted into the tosylate which is reacted with an alkali metal cyanide such as sodium cyanide in dimethylformamide, or the like, to afford a cyanide of Formula XIV. By subjecting a cyanide of Formula XIV to hydrolysis using a base, e.g. an alkali metal hydroxide such as potassium hydroxide, in aqueous methanol, glycol, or the like, the corresponding acid (XII) is obtained which can be further modified as illustrated and described above to obtain the compounds of Formulas XIII through XVII.

Compounds of the present invention of Formulas A and B wherein R⁴ is —CH₂—R⁵ in which R⁵ is hydroxy can be esterified and etherified to obtain the corresponding hydrolyzable esters and ethers. Esterification can be carried out, for example, by treating the free hydroxy compound with a carboxylic acid anhydride or carboxylic acid halide in pyridine, or the like, to obtain esters of organic acids. Esters of inorganic acids such as the sulfates can be prepared by treating the free hydroxy compound with a sulfur trioxide trimethylamine complex in pyridine or by procedures such as described by Kornel et al., Steroids 4, 67 (1964); Kirdani, Steroids 6, 845 (1965); and Bernstein, Steroids 7, 577 (1966). Phosphate esters can be prepared from the free hydroxy compounds by treatment with, e.g. β-cyanoethylphosphate in the presence of N,N'-dicyclohexylcarbodiimide in pyridine or by the method of Wendler, Chem. & Ind., 1175 (1967) or U.S. Pats. 2,936,313; 3,248,408; or 3,254,100. Alkali metal salts of the esters can be made by treatment with base, e.g. sodium ethylate, sodium or potassium bicarbonate, and the like. By controlling the amount of base, both the mono and di salts can be obtained.

By treatment of a free alcohol of Formulas A and B with dihydropyran or dihydrofuran in the presence of an acid catalyst, tetrahydropyranyl and tetrahydrofuranyl ethers are obtained. Tetrahydropyranyl ethers and tetrahydrofuranyl ethers can also be prepared by reacting the free alcohol with about a molar equivalent of 2-benzoyloxytetrahydropyran and 2-benzoyloxytetrahydrofuran, respectively, in an inert organic solvent under substantially neutral conditions. See Lawesson et al., Acta Chem. Scand., 14, No. 8, 1854 (1960). The 4'-methoxytetrahydropyran-4'-yl ethers are obtained by reacting the free alcohol with an excess of 4-methoxy-5,6-dihydro-2H-pyran in the presence of a small amount of an acidic catalyst such as p-toluenesulfonic acid at about room temperature. See Reese et al., Journal of the American Chemical Society, 89:13, 3366 (1967). Ethers of the oxido compounds of Formula B are preferably prepared using as near neutral conditions as possible. Thus, tetrahydropyranyl and tetrahydrofuranyl ethers of Formula B are made using 2-benzoyloxytetrahydropyran and 2-benzoyloxytetrahydrofuran, respectively. The 4'-methoxytetrahydropyranyl ethers are preferably made as described above using p-toluenesulfonyl chloride as the catalyst.

Compounds of Formulas A and B wherein R⁴ is —COOR⁶ in which R⁶ is alkali metal can be prepared by treating the corresponding free acid with an aqueous solution of a base such as sodium or potassium bicarbonate or by titrating with an alcohol solution of an alkali metal alkoxide such as sodium methoxide, potassium methoxide, and the like. The novel lower alkyl acid esters of the present invention can be obtained by treating a free acid of Formulas A and B with ethereal diazoalkane. They can also be prepared by treating an alkali metal salt of the acid with a lower alkyl iodide or bromide in dimethylacetamide, or the like.

Acid amides of Formulas A and B (R⁴ is —CONH₂) are prepared, for example, by treating an acid of Formulas A and B with thionyl chloride followed by treatment with anhydrous ammonia. By treating a lower alkyl acid ester of Formulas A and B with hydroxylamine hydrochloride in the presence of sodium methoxide, the novel hydroxamic acids of Formulas A and B (R⁴ is —CONHOH) are obtained.

The acid fluorides of Formulas A and B (R⁴ is —COF) are obtained by treating the free acid with N-(2-chloro-1,1,2-trifluoroethyl)diethylamine in an inert solvent such as ether, acetonitrile or methylene chloride. The acid chlorides of Formulas A and B (R⁴ is —COCl) are obtained by treating the free acid with triphenyl phosphine in carbon tetrachloride or by treatment with thionyl chloride or oxalyl chloride in an organic solvent such as benzene or chloroform at room temperature or above.

The compounds of the present invention of Formulas A and B are valuable therapeutic agents having estrogenic activity. They are useful, for example, in veterinary medicine for the treatment of underdeveloped females, in the poultry industry for caponization, for the fatening of cattle, and in the control and regulation of fertility. They can be administered in conjunction with one or more pharmaceutically acceptable excipients, orally or by injection. The most favorable dosage is easily determinable by one of ordinary skill in the art giving due consideration to such factors as the conditions being treated, age, response to initial treatment and degree and severity of the condition being treated. As a guide, a dosage level of from about 5 μg. to about 1 mg. per kilogram of body weight per day can be used.

The following examples are provided to illustrate the practice of the present invention.

PREPARATION 1

A solution of 10 g. of 2-naphthylacetic acid in 100 ml. of ethanol:ether (1:1) is added to 15 g. of sodium in 500 ml. of liquid ammonia at −78°. After about one hour, excess sodium is destroyed by the addition of ammonium chloride and about 50 ml. of water is added. The reaction mixture is then allowed to rise to room temperature and then about 200 ml. of water followed by about 400 ml. of ether is added. The ether layer is washed, dried over magnesium sulfate and evaporated to give 1,4,5,8-tetrahydro-2-naphthylacetic acid which can be purified by recrystallization from aqueous methanol.

By repeating the above procedure using 2-(6'-methoxy-2-naphthyl)ethanol as the starting material, there is obtained 2-(6'-methoxy-1',4',5',8'-tetrahydro-2'-naphthyl)-ethanol.

PREPARATION 2

(A) A solution of 1 g. of 1,4,5,8-tetrahydro-2-naphthylacetic acid in dry tetrahydrofuran is refluxed for about 48 hours with a molar excess of lithium aluminum hydride. The reaction mixture is diluted with water and ethyl acetate. The ethyl acetate layer is separated, washed, dried and evaporated to give 2-(1',4',5',8'-tetrahydro-2'-naphthyl)ethanol.

(B) A mixture of 1 g. of the above compound, 4 ml. of pyridine and 4 ml. of acetic anhydride is allowed to stand at room temperature for 15 hours. The mixture is then poured into water and extracted several times with ethyl acetate. The ethyl acetate extracts are combined, washed with dilute hydrochloric acid and water, dried and evaporated to give the acetate of 2-(1',4',5',8'-tetrahydro-2'-naphthyl)ethanol.

The procedure of Part A above is repeated using 6-methoxy-2-naphthylacetic acid as the starting material and there is obtained 2-(6'-methoxy-2'-naphthyl)ethanol.

As an alternative to the procedure of Part A, prior to reduction, the acid can be converted into the methyl ester as by treatment with diazomethane or the like, and the thus-obtained methyl ester then converted into the alcohol by treatment with lithium aluminum hydride at about room temperature for about two hours.

PREPARATION 3

(A) To a solution of 5 g. of the acetate of 2-(1',4',5',8'-tetrahydro-2'-naphthyl)ethanol in 100 ml. of diglyme heated to about 135°, there is added slowly a solution of 1.5 equivalents of sodium trichloroacetate in 100 ml. of diglyme over a period of about one hour. The reaction mixture is then allowed to cool to about room temperature and is then diluted with water and ethyl acetate. The ethyl acetate layer is separated, washed, dried over magnesium sulfate and evaporated to give a mixture containing the acetate of 2-(9',10'-dichloromethylene-1',4',5',8',9',10'-hexahydro-2'-naphthyl)ethanol which is separated by chromatography.

By using sodium chlorodifluoroacetate in place of sodium trichloroacetate in the above procedure, there is obtained the acetate of 2-(9',10'-difluoromethylene-1',4',5',8',9',10'-hexahydro-2'-naphthyl)ethanol.

(B) A solution of 0.75 g. of the acetate of 2-(9',10'-dichloromethylene-1',4',5',8',9',10'-hexahydro-2'-naphthyl)ethanol in 50 ml. of ether is added to a solution of 500 mg. of sodium in 150 ml. of liquid ammonia with stirring. After two hours, ammonium chloride is added until the blue color is discharged and the ammonia allowed to evaporate. Extraction with ether affords 2-(9',10'-methylene-1',4',5',8',9',10'-hexahydro-2'-naphthyl)ethanol which can be further purified by chromatography.

PREPARATION 4

(A) Two milliliters of dihydropyran are added to a solution of 1 g. of 2-(9',10'-methylene-1',4',5',8',9',10'-hexahydro-2'-naphthyl)ethanol in 15 ml. of benzene. About 1 ml. is removed by distillation to remove moisture and 10 mg. of p-toluenesulfonic acid is added to the cooled solution. This mixture is allowed to stand at room temperature for four days, and then washed with aqueous sodium carbonate solution and water, dried and evaporated. The residue is chromatographed on neutral alumina, eluting with hexane, to afford the tetrahydropyran-2''-yl ether of 2-(9',10'-methylene-1',4',5',8',9',10'-hexahydro-2'-naphthyl)ethanol.

(B) To a solution of 1 g. of the above tetrahydropyran-2''-yl ether in 100 ml. of carbon tetrachloride containing a trace of pyridine, there is added 2 molar equivalents of bromine in 50 ml. of carbon tetrachloride. The reaction mixture is allowed to stand at room temperature for about 20 hours. The reaction mixture is washed, dried and evaporated to give the tetrahydropyran-2''-yl ether of 2-(2',3',6',7'-tetrabromo-9',10'-methylenedecahydro-2'-naphthyl)ethanol.

One gram of the above 2,3,6,7-tetrabromocompound is dissolved in 15 ml. of dry tetrahydrofuran and then about 4 g. of potassium t-butoxide is added. The reaction mixture is stirred for about three hours and then it is diluted with water and ether. The ether layer is separated, washed, dried and evaporated to give the tetrahydropyran-2''-yl ether of 2-(1',6'-methanocyclodecapentaen-3'-yl)ethanol.

PREPARATION 5

(A) To a solution of 1 g. of the tetrahydropyran-2''-yl ether of 2-(1',6'-methanocyclodecapentaen-3'-yl)-ethanol in 30 ml. of acetic acid is added 0.5 ml. of 2 N hydrochloric acid. The mixture is allowed to stand about five hours at room temprature and then diluted with water and extracted with methylene chloride. The methylene chloride extracts are washed with water to neutrality, dried and evaporated to afford 2-(1',6'-methanocyclodecapentaen-3'-yl)ethanol.

(B) A mixture of 1 g. of 2-(1',6'-methanocyclodecapentaen-3'-yl)ethanol and 50 ml. of pyridine is added to a mixture of one molar equivalent of chromium trioxide in 20 ml. of pyridine. The reaction mixture is allowed to stand at room temperature for 15 hours, diluted with ethyl acetate and filtered. The filtrate is washed well with dilute hydrochloric acid and water, dried and evaporated to give 2-(1',6'-methanocyclodecapentaen-3'-yl)ethanol [1,6-methanocyclodecapentaen-3-ylacetaldehyde].

(C) The procedure of Part B is repeated using the above prepared aldehyde as the starting material and there is obtained 1,6-methanocyclodecapentaen-3-ylacetic acid.

PREPARATION 6

The procedure of Preparation 4 (Part B) is repeated using the acetate of 2-(9',10'-dichloromethylene-1',4',5',8',9',10'-hexahydro-2'-naphthyl)ethanol and the acetate of 2-(9',10'-difluoromethylene-1',4',5',8',9',10'-hexahydro-2'-naphthyl)ethanol as the starting material in place of the tetrahydropyran-2''-yl ether of 2-(9',10'-methylene-1',4',5',8',9',10'-hexahydro-2'-naphthyl)ethanol and there is obtained 2-(1',6'-dichloromethanocyclodecapentaen-3'yl)ethanol and 2-(1',6'-difluoromethanocyclodecapentaen-3'-yl)ethanol, respectively.

By repeating the procedure of Preparation 5 (Part B) using 2-(1',6'-dichloromethanocyclodecapentaen-3'-yl)ethanol and 2-(1',6'-difluoromethanocyclodecapentaen-3'-yl)ethanol as the starting material, there is obtained 2-(1',6'-dichloromethanocyclodecaptentaen-3'-yl)ethanol and 2-(1',6'-difluoromethanocyclodecapentaen-3'-yl)ethanol, respectively, which are subjected to the procedure of Preparation 4 (Part C) to afford the corresponding acids, i.e. 1,6-dichloromethanocyclodecapentaen-3-ylacetic acid and 1,6-difluoromethanocyclodecapentaen-3-ylacetic acid, respectively.

PREPARATION 7

To a solution of 1 g. of 1,6-methanocyclodecapentaen-3-ylacetic acid in 25 ml. of ethanol, there is added with stirring an aqueous solution of a molar equivalent of sodium bicarbonate. This mixture is stirred until the evolution of carbon dioxide ceases and then the mixture is evaporated to furnish the sodium salt of 1,6-methanocyclodecapentaen-3-ylacetic acid.

The sodium salt of 1,6-dichloromethanocyclodecapentaen-3-ylacetic acid and 1,6-difluoromethanocyclodecapentaen-3-ylacetic acid are similarly prepared.

PREPARATION 8

A mixture of 1 g. of the sodium salt of 1,6-methanocyclodecapentaen-3-ylacetic acid, 3 ml. of methyl iodide and 20 ml. of dimethylacetamide is stirred in the dark for five hours. Excess methyl iodide is removed by evaporation under reduced pressure. The mixture is then poured into water and extracted several times with ether. The ether extracts are combined, washed, dried and evaporated to give the methyl ester of 1,6-methanocyclodecapentaen-3-ylacetic acid.

Alternatively, the free acids of Preparation 6 can be converted into the methyl ester by treatment with diazomethane in ether for a few hours.

PREPARATION 9

To a mixture of 22 g. of the methyl ester of 1,6-methanocyclodecapentaen-3-ylacetic acid, 2.5 g. of sodium hydride and 150 ml. of 1,2-dimethoxyethane, there is added 25 g. of methyl iodide. The reaction mixture is allowed to stand for several hours and is then diluted with ethanol and water. The mixture is then extracted with methylene chloride. The methylene chloride extracts are combined, washed, dried and evaporated to give the methyl ester of 2-(1',6'-methanocyclodecapentaen-3'-yl)propionic acid.

By using ethyl iodide, n-propyl iodide or i-propyl iodide in place of methyl iodide, there is obtained the methyl ester of 2-(1',6'-methanocyclodecapentaen-3'-yl)butyric acid, the methyl ester of 2-(1',6'-methanocyclodecapentaen-3'-yl)pentanoic acid and the methyl ester of 2-(1',6'-methanocyclodecapentaen-3'-yl)-3-methylbutyric acid, respectively.

Likewise, the corresponding 1',6'-dichloromethano and 1',6'-difluoromethano compounds are obtained.

PREPARATION 10

A mixture of 25 g. of the methyl ester of 2-(1',6'-methanocyclodecapentaen-3'-yl)propionic acid, 15 g. of sodium carbonate, 200 ml. of methanol and 25 ml. of water is allowed to stand for 24 hours. The reaction mixture is acidified by the addition of dilute HCl and then extracted with methylene chloride. The methylene chloride extracts are combined, washed, dried and evaporated to give 2-(1',6'-methanocyclodecapentaen-3'-yl)propionic acid (I; R is hydrogen, $R^1$ is methyl, $x$ is methylene).

By use of the above procedure, 2-(1',6'-methanocyclodecapentaen-3'-yl)butyric acid (I; R is hydrogen, $R^1$ is ethyl, $x$ is $CH_2$), 2-(1',6'-methanocyclodecapentaen-3'-yl)pentanoic acid (I; R is hydrogen, $R^1$ is n-propyl, $x$ is $CH_2$) and 2-(1',6'-methanocyclodecapentaen-3'-yl) - 3 - methylbutyric acid (I; R is hydrogen, $R^1$ is i-propyl, $x$ is $CH_2$) are obtained from the corresponding methyl esters of Preparation 9. Likewise, the other starting materials of Formula I wherein R is hydrogen and $x$ is dichloromethylene or difluoromethylene are obtained using the above procedures from the corresponding 1',6'-dichloromethylene and 1',6'-difluoromethylene compounds.

PREPARATION 11

(A) A solution of 20 g. of meta-chloroperbenzoic acid (75%) in 300 ml. of ethylene chloride is added slowly to one equivalent of the acetate of 2-(1',4'-5',8'-tetrahydro-2'-naphthyl)ethanol in about 400 ml. of methylene chloride at −78° over a period of about one hour. After addition is complete, the reaction mixture is allowed to warm to room temperature. The reaction mixture is then washed with water, dried and evaporated to give the acetate of 2-(9',10'-oxido-1',4',5',8',9',10'-hexahydro-2'-naphthyl)ethanol.

(B) One gram of the above acetate is allowed to stand at room temperature for 15 hours with 1 g. of potassium bicarbonate in 10 ml. of water and 90 ml. of methanol. At the end of this time, the methanol is evaporated under reduced pressure and the residue is extracted with ethyl acetate and water. Evaporation of the ethyl acetate from these extracts yields 2-(9',10'-oxido-1',4',5',8',9',10'-hexahydro-2'-naphthyl)ethanol which is crystallized from acetone:hexane.

PREPARATION 12

A mixture of 1 g. of 2-(9',10'-oxido-1',4',5',8',9',10'-hexahydro-2'-naphthyl)ethanol, 4 ml. of pyridine and 2 ml. of trimethylacetyl chloride is allowed to stand at room temperature for 15 hours. The mixture is then poured into water and extracted with methylene chloride. The methylene chloride extracts are combined, washed, dried and evaporated to give the trimethylacetate of 2-(9',10'-oxido-1',4',5',8',9',10'-hexahydro-2'-naphthyl)ethanol.

The procedure of preparation 4 (Part B) is repeated using the trimethylacetate of 2-(9',10'-oxido-1',4',5',8',9',10'-hexahydro-2'-naphthyl)ethanol as the starting material and there is obtained the trimethylacetate of 2-(9',10'-oxido - 2',3',6',7'-tetrabromodecahydro-2'-naphthyl)ethanol and then the trimethylacetate of 2-(1',6'-oxidocyclodecapentaen-3'-yl)ethanol.

PREPARATION 13

(A) A mixture of 1 g. of the trimethylacetate of 2-(1',6'-oxidocyclodecapentaen-3'-yl)ethanol in 60 ml. of methanol is treated with a solution of 0.5 g. of potassium hydroxide in 3 ml. of water. The mixture is heated at reflux for one hour and then cooled, diluted with water and extracted with methylene chloride. The methylene chloride extracts are combined, washed, dried and evaporated to give 2-(1',6'-oxidocyclodecapentaen-3'-yl)ethanol.

(B) To a substantially anhydrous solution of 1 g. of 2-(1',6'-oxidocyclodecapentaen-3'-yl)ethanol in 50 ml. of dimethylsulfoxide, there is added 0.5 molar equivalents of anhydrous orthophosphoric acid and 5 molar equivalents of anhydrous N,N'-dicyclohexylcarbodiimide. The reaction mixture is allowed to stand at room temperature for about 30 minutes. The reaction mixture is then concentrated by evaporation under vacuum and taken up in petroleum ether. This mixture is washed, dried and evaporated to give 2-(1',6'-oxidocyclodecapentaen-3'-yl)ethanal [1,6-oxidocyclodecapentaen-3-ylacetaldehyde].

By subjecting the above aldehyde to oxidation using dicyclohexylcarbodiimide according to the above procedure, the corresponding acid is obtained, i.e. 1,6-oxidocyclodecapentaen-3-ylacetic acid which can be conevrted into the corresponding lower alkyl ester using an ethereal diazoalkane, e.g. diazomethane, or sodium hydride and lower alkyl iodide as described in Preparation 8 and alkylation can be accomplished using the procedure of Preparation 9 to obtain the methyl ester of 1,6-oxidocyclodecapentaen-3-ylacetic acid and the methyl ester of 2-(1',6'-oxidocyclodecapentaen-3'-yl)propionic acid.

The methyl ester of 2-(1',6'-oxidocyclodecapentaen-3'-yl)propionic acid is reduced using the procedure of Preparation 2 to afford 2-(1',6'-oxidocyclodecapentanen-3'-yl)propanol (IX; R' is hydrogen, $R^1$ is methyl).

Likewise, using the processes of Preparations 11, 12 and 13, 2-(1',6'-oxidocyclodecapentaen-3'-yl)butanol (IX; R' is hydrogen, $R^1$ is ethyl), 2-(1',6'-oxidocyclodecapentaen-3-yl)pentanol (IX; R' is hydrogen, $R^1$ is n-propyl) and 2-(1'6'-oxidocyclodecapentaen-3'-yl)-3-methylbutanol (IX; R' is hydrogen, $R^1$ is i-propyl) are prepared.

PREPARATION 14

A mixture of 2 g. of 2-(6'-methoxy-1',4',5',8'-tetrahydro-2'-naphthyl)ethanol and 35 ml. of methanol is heated to reflux and 3.5 ml. of acetic acid added. This mixture is refluxed for about 15 minutes and then allowed to cool. The mixture is then diluted with water and extracted with methylene chloride. The methylene chloride extracts are combined and then washed, dried and evaporated to give 2-(6'-oxo-1',4',5',6',7',8'-hexahydro-2'-naphthyl)ethanol which is converted into 2-(6'-oxo-9',10'-dichloromethylene - 1',4',5',6',7',8',9',10' - octahydro-2'-naphthyl)ethanol and 2-(6'-oxo-9',10'-difluoromethylene-1',4',5',6',7',8',9',10'-octahydro-2'-naphthyl)ethanol using the procedure of Preparation 3 (Part A).

PREPARATION 15

By subjecting 2-(6'-oxo-9',10'-dichloromethylene-1',4',5',6',7',8',9',10'-octahydro-2'-naphthyl)ethanol to the procedure of Preparation 4 (Part A), there is obtained the tetrahydropyran-2''-yl ether of 2'-(6'-oxo-9',10'-dichloromethylene - 1',4',5',6',7',8',9',10'-octahydro-2'-naphthyl)-ethanol which is converted into the tetrahydropyran-2''-yl ether of 2-(6'-hydroxy-9',10'-methylene-1',4',5',6',7',8',9',10'-octahydro-2'-naphthyl)ethanol using the procedure of Preparation 3 (Part B). The thus-obtained 6'-hydroxy derivative is oxidized using the procedure of Preparation 5 (Part B) to give the tetrahydropyran-2''-yl ether of 2-(6'-oxo - 9',10'-methylene-1',4',5',6',7',8',9',10'-octahydro-2'-naphthyl)ethanol.

PREPARATION 16

A mixture of 2.0 g. of the tetrahydropyran-2''-yl ether of 2 - (6'-oxo-9',10'-methylene-1',4',5',6',7',8',9',10'-octahydro-2'-naphthyl)ethanol, 2.3 g. of cupric bromide and 200 ml. of methanol is refluxed for 24 hours. The reaction mixture is poured into water and the resulting mixture extracted with chloroform. The organic extracts are dried over magnesium sulfate and evaporated. The residue is chromatographed on silica gel to give the tetrahydropyran-2''-yl ether of 2-(6'-oxo-7'-bromo-9',10'-methylene-1',4',5',6',7',8',9',10'-octahydro-2'-naphthyl)ethanol.

A mixture of 1 g. of the above 7-bromo compound, 1.2 g. of lithium bromide and 100 ml. of dimethylformamide is stirred at about 90° for 20 hours. The reaction mixture is poured into water and extracted with ether. The ether extracts are washed well with water, dried and evaporated. The residue is chromatographed on alumina to yield the tetrahydropyran-2''-yl ether of 2-(6'-oxo-9',10'-methylene - 1',4',5',6',9',10' - hexahydro-2'-naphthyl)ethanol.

As an alternative to the above procedure, the 7,8-dehydro of the tetrahydropyran-2''-yl ether of 2-(6'-oxo-9',10'-methylene-1',4',5',6',7',8',9',10' - octahydro-2'-naphthyl)ethanol can be prepared using 2,3-dichloro-5,6-dicyano-1,4-benzoquinone in dioxane under reflux conditions.

PREPARATION 17

A mixture of 1 g. of the tetrahydropyran-2''-yl ether of 2-(6'-oxo-9',10'-methylene-1',4',5',6',9',10'-hexahydro-2'-naphthyl)ethanol, 15 ml. of acetic anhydride and 0.2 g. of sodium acetate is refluxed for one hour. The reaction mixture is then poured into dilute sodium bicarbonate solution to hydrolyze any excess anhydride. This mixture is extracted with methylene chloride. The methylene chloride extracts are combined, washed, dried and evaporated to give the tetrahydropyran-2''-yl ether of 2-(1',6'-methano-8-acetoxycyclodecatetraen-3'-yl)ethanol.

PREPARATION 18

A mixture of 2 g. of the tetrahydropyran-2''-yl ether of 2 - (1',6'-methano-8'-acetoxycyclodecatetraen-3'-yl)-ethanol and one molar equivalent of N-bromosuccinimide in 100 ml. of carbon tetrachloride is refluxed for about 1.5 hours. The mixture is cooled and filtered. The filtrate is concentrated and to the residue there is added 0.5 g. of calcium carbonate and 25 ml. of dimethylformamide. The reaction mixture is heated at reflux for about 30 minutes and then cooled. The mixture is filtered and the filtrate evaporated to give the tetrahydropyran-2''-yl ether of 2-(1',6'-methano-8'-acetoxycyclodecapentaen-3'-yl)ethanol which is purified by chromatography.

The tetrahydropyran-2''-yl ether of 2-(1',6'-methano-8'-acetoxycyclodecapentaen-3'-yl)ethanol is subjected to the procedures of Preparation 5 to give 2-(1',6'-methano-8'-acetoxycyclodecapentaen-3'-yl)ethanol, 2-(1',6'-methano-8'-acetoxycyclodecapentaen-3'-yl)ethanal, and 1,6-methoxy-8-acetoxycyclodecapentaen-3-ylacetic acid, respectively.

PREPARATION 19

One gram of the tetrahydropyran-2''-yl ether of 2-(1',6' - methano-8'-acetoxycyclodecapentaen-3'-yl)ethanol is allowed to stand at room temperature for 15 hours with 1 g. of potassium bicarbonate in 10 ml. of water and 90 ml. of methanol. The reaction mixture is then concentrated under reduced pressure and dried. The residue is taken up in about 10 ml. of anhydrous dioxane and to this mixture is added 1 ml. of methylorthoformate and a trace of p-toluenesulfonic acid. The mixture is stirred at room temperature for about 15 minutes and then allowed to stand at room temperaure for about 30 minutes. The mixture is diluted with water and shaken and then extracted with methylene chloride. The methylene chloride extracts are combined, washed, dried and evaporated to give 2-(1',6'-methano-8'-methoxycyclodecapentaen-3'-yl)ethanol which is subjected to the procedures of Preparation 5 (Parts B and C) to give the corresponding aldehyde and acid, i.e. 2-(1',6'-methano-8'-methoxycyclodecapentaen-3'-yl)ethanal and 1,6-methano-8-methoxycyclodecapentaen-3-ylacetic acid.

PREPARATION 20

By subjecting 2 - (6'-oxo-1',4',5',6',7',8'-hexahydro-2'-naphthyl)ethanol to the procedure of Preparation 12, there is obtained the trimethylacetate of 2-(6'-oxo-1',4',5',6',7',8'-hexahydro-2'-naphthyl)ethanol which is converted into the corresponding 9',10'-oxido derivative using the procedure of Preparation 11 ( Part A).

The trimethylacetate of 2-(6'-oxo-9',10'-oxido-1',4',5',6',7',8',9',10'-octahydro-2'-naphthyl)ethanol is then treated with cupric bromide according to the procedure of Preparation 16 to give the corresponding 7-bromo compound.

PREPARATION 21

A mixture of 3 g. of the trimethylacetate of 2-(6'-oxo-7'-bromo-9',10'-oxido - 1',4',5',6',7',8',9',10' - octahydro-2'-naphthyl)ethanol, about 2 equivalents of zinc powder and 200 ml. of dry tetrahydrofuran is stirred for about two hours at 50–60°. Stirring is continued until formation of zinc enolate is complete as checked by thin layer chromatography. The mixture is allowed to stand and cool and then decanted under anhydrous conditions. To the thus-obtained solution, there is added about 50 ml. of dimethylsulfate and the mixture stirred. The reaction mixture is then allowed to stand at room temperature until formation of the enol ether is complete as checked by thin layer chromatography. The reaction mixture is then poured into water. This mixture is extracted with methylene chloride. The methylene chloride extracts are washed, dried and and evaporated to give the trimethylacetate of 2-(6'-methoxy-9',10' - oxide - 1',4',5',8',9',10' - hexahydro-2'-naphthyl)ethanol.

PREPARATION 22

A mixture of 2 g. of the trimethylacetate of 2-(6'-methoxy-9',10' - oxide - 1',4',5',8',9',10' - hexahydro-2'-naphthyl)ethanol and 2 equivalents of N-bromosuccinimide in 50 ml. of carbon tetrachloride is refluxed for about one hour. The mixture is then filtered and evaporated to dryness under reduced pressure to yield the trimethylacetate of 2-(6'-methoxy - 4',8' - dibromo-9',10'- oxido-1',4',5',8',9',10'-hexahydro - 2' - naphthyl)ethanol which is treated with potassium t-butoxide according to the procedure of Preparation 4 (Part B) to give the trimethylacetate of 2-(8'-methoxy-1',6'-oxidocyclodecapentaen-3'-yl)ethanol.

By use of the procedure of Preparation 13, the trimethylacetate of 2 - (8' - methoxy - 1',6' - oxidocyclodecapentaen-3'-yl)ethanol is hydrolyzed and then oxidized to give 2-(8'-methoxy-1',6'-oxidocyclodecapentaen-3'-yl) ethanol, 2-(8'-methoxy-1',6'-oxidocyclodecapentaen-3'-yl) ethanol and 8-methoxy-1,6-oxidocyclodecapentaen-3 - yl- acetic acid, respectively.

PREPARATION 23

By subjecting the tetrahydropyran-2"'-yl ether of 2-(6'-oxo-9',10'-dichloromethylene-1',4',5',6',7',8',9',10' - octahydro-2'-naphthyl)ethanol and the tetrahydropyran-2"'-yl ether of 2-(6-oxo-9',10'-difluoromethylene-1',4',5',6',7',8', 9',10-octahydro-2'-naphthyl)ethanol to the processes of Preparations 16 and 17, there is obtained the tetrahydropyran-2"'-yl ether of 2-(1',6'-dichloromethano-8'-acetoxy cyclodecatetraen-3' - yl)ethanol and the tetrahydropyran-2"'-yl ether of 2-(1',6'-difluoromethano-8'-acetoxycyclodecatetraen-3'-yl)ethanol, respectively, which are further treated according to the procedures of Preparation 18 to give the tetrahydropyran-2"'-yl ether of 2-(1',6'-dichloromethano-8'-acetoxycyclodecapentaen-3'-yl)ethanol, 2-(1', 6'-dichloromethano-8'-acetoxycyclodecapentaen - 3' - yl) ethanol 2-(1',6'-dichloromethano - 8 - acetoxycyclodecapentaen-3'-yl)ethanol and 1,6-dichloromethano-8-acetoxycyclodecapentaen-3-ylacetic acid and the tetrahydropyran-2"'-yl ether of 2-(1',6'-difluoromethano-8' - acetoxycyclo_ decapentaen-3'-yl)ethanol, 2-(1',6'-difluoromethano - 8'-acetoxycyclodecapentaen-3'-yl)ethanol, 2-(1',6' - difluoromethano-8'-acetoxycyclodecapentaen-3'-yl)ethanal and 1, 6-difluoromethano-8-acetoxycyclodecapentaen-3 - ylacetic acid, respectively.

By repeating Preparation 19 using as the starting material the tetrahydropyran-2"'-yl ether of 2-(1',6'-dichloromethano-8'-acetoxycyclodecapentaen-3' - yl)ethanol and the tetrahydropyran-2"'-yl ether of 2-(1',6'-dichlorometh- ano-8'-acetoxycyclodecapentaen-3'-yl)ethanol, there is obtained 2-(1',6'-dichloromethano - 8' - methoxycyclodecapentaen-3'-yl)ethanol, 2-(1',6'-dichloromethano-8' - methoxycyclodecapentaen-3'-yl)ethanol and 1,6 - dichloromethano-8-methoxycyclodecapentaen-3-ylacetic acid and 2-(1',6'-difluoromethano-8'-methoxycyclodecapentaen-3'-yl)ethanol, 2 - (1',6'-difluoromethano-8'-methoxycyclodecapentaen-3'-yl)ethanol and 1,6 - difluoromethano-8-methoxycyclodecapentaen-3-ylacetic acid, respectively.

By using the procedure of Preparation 8, 8-methoxy-1,6-oxidocyclodecapentaen-3-ylacetic acid, 1,6-methano-8-methoxycyclodecapentaen-3-ylacetic acid, 1,6 - dichloromethano-8-methoxycyclodecapentaen-3-ylacetic acid and 1,6-difluoromethano-8-methoxycyclodecapentaen - 3 - yl- acetic acid are converted into the corresponding methyl ester. The thus-obtained methyl esters are alkylated using the procedure of Preparation 9 to afford the methyl ester of 2-(8'-methoxy-1',6'-oxidocyclodecapentaen - 3' - yl) propionic acid, the methyl ester of 2-(8'-methoxy-1',6'-methanocyclodecapentaen-3'-yl)propionic acid, the methyl ester of 2-(1',6'-dichloromethano-8'-methoxycyclodecapentaen-3'-yl)propionic acid and the methyl ester of 2-(1', 6'-difluoromethano-8'-methoxycyclodecapentaen-3' - yl) propionic acid, respectively.

The methyl ester of 2-(8'-methoxy-1',6' - oxidocyclodecapentaen-3'-yl)propionic acid is reduced using the procedure of Preparation 2 to afford 2-(8'methoxy - 1',6'-oxidocyclodecapentaen-3'-yl)propanol (IX; R' is methoxy, $R^1$ is methyl). There is siimlarly prepared 2-(8'-methoxy-1',6'-oxidocyclodecapentaen-3'-yl)butanol (IX; R' is methoxy, $R^1$ is ethyl), 2-(8'-methoxy-1',6'-oxidocyclodecapentaen-3'-yl)pentanol (IX; R' is methoxy, $R^1$ is n-propyl) and 2-(8'-methoxy-1',6'-oxidocyclodeca- pentaen-3'-yl)-3-methylbutanol (IX; R' is methoxy, $R^1$ is i-propyl) using the above procedures.

The methyl ester of 2-(8'-methoxy-1',6'-methanocyclo- decapentaen-3'-yl)propionic acid, the methyl ester of 2- (8'-methoxy - 1',6' - dichloromethylenecyclodecapentaen-3'-ylpropionic acid and the methyl ester of 2-(8'-methoxy-1',6'-difluoromethylenecyclodecapentaen - 3' - yl) propionic acid is hydrolyzed using the procedure of Preparation 10 to afford the corresponding acids of Formula I in which R is methoxy, $R^1$ is methyl and x is $CH_2$, $CF_2$ and $CCl_2$. Likewise, the other compounds of Formula I wherein R is methoxy and $R^1$ is ethyl, n-propyl and i- propyl are prepared using the foregoing procedures.

PREPARATION 24

A suspension of 1 g. of 2-(8'-methoxy-1',6'-methano- cyclodecapentaen-3'-yl)propionic acid in 10 ml. of 48% aqueous hydrofluoric acid is stirred at 0° C. for about 90 minutes. The reaction mixture is diluted with water and ethyl acetate. The ethyl acetate layer is washed, dried and evaporated to dryness under reduced pressure and the residue chromatographed to give 2-(6'-oxo-9',10'-methyl- ene-5',6',9',10'-tetrahydro-2'-naphthyl)propionic acid.

A mixture of 1 g. of 2-(6'-oxo-9',10'-methylene-5',6', 9',10'-tetrahydro-2'-naphthyl)propionic acid, 15 ml. of acetic anhydride and 0.2 g. of sodium acetate is refluxed for about one hour. The reaction mixture is then poured into water to hydrolyze any excess anhydride. Thereafter, the mixture is extracted with methylene chloride. The methylene chloride extracts are combined, washed, dried and evaporated to give 2-(8'-acetoxy-1',6'-methanocyclo- decapentaen-3'-yl)propionic acid (I; R is acetoxy, $R^1$ is methyl, x is $CH_2$).

By repeating the process of this preparation using 2- (8'-methoxy-1',6' - difluoromethanocyclodecapentaen - 3'- yl)propionic acid and 2-(8'-methoxy - 1',6' - dichloromethanocyclodecapentaen-3' - yl)propionic acid as the starting materials, there is obtained 2-(8'-acetoxy-1',6'- difluoromethanocyclodecapentaen - 3' - yl)propionic acid and 2-(8' - acetoxy - 1',6' - dichloromethanocyclodeca- pentaen-3' - yl)propionic acid, respectively. The butyric acid, pentanoic acid and 3-methylbutyric acids of Formula I are prepared in the same manner as the propionic acid of Formula I.

EXAMPLE 1

A mixture of 1 g. of 2-(8'-methoxy-1',6'-methanocyclo- decapentaen-3'-yl)propionic acid and 4 ml. of oxalyl chloride in benzene is heated at reflux under anhydrous conditions for two hours. The solution is evaporated under vacuum, taken up in benzene and again evaporated to yield 2-(8'-methoxy - 1',6' - methanocyclodecapentaen - 3' - yl) propionic acid chloride (II; R is methoxy, $R^1$ is methyl, $R^7$ is chloro, x is methylene).

The above procedure is repeated using 2-(8'-methoxy- 1',6'-methanocyclodecapentaen-3'-yl)butyric acid (I; R is methoxy, $R^1$ is ethyl, x is methylene), 2-(1',6'-methano- cyclodecapentaen-3'-yl)butyric acid, 2-(8'-methoxy-1',6'- difluoromethanocyclodecapentaen-3'-yl)butyric acid and 2-(8'-methano - 1',6' - dichloromethanocyclodecapentaen-3'-yl)butyric acid as the starting material and there is obtained the corresponding acid chloride. The foregoing procedure is repeated at room temperature for three hours and the same products are obtained.

EXAMPLE 2

(A) A solution of 10 g. of 2-(8'-methoxy-1',6'-meth- anocyclodecapentaen-3'-yl)propionic acid chloride in dry ether is added slowly to an ethereal solution of 3 molar equivalents of diazomethane. The reaction mixture is allowed to stand for 12 hours at 0–10° C. and then is evaporated under reduced pressure to a residue. A slurry of silver oxide in methanol (prepared from 1.5 g. of silver nitrate and washed with methanol) is added to a solution of 6 g. of the residue in 100 ml. of methanol heated to about 50° C. The addition of silver oxide is made in small portions at a rate sufficient to maintain the evolution of nitrogen. After about 24 hours, water is added and the mixture extracted with ethyl acetate. The ethyl acetate extracts are combined, washed, dried and evaporated under reduced pressure to yield the methyl ester of 3-(8'-methoxy - 1',6' - methanocyclodecapentaen-3'-yl)butyric acid (III; R is methoxy, $R^1$ is methyl, $x$ is methylene).

(B) A mixture of 2 g. of the above methyl ester, 2.2 molar equivalents of methyl iodide, 2.2 molar equivalents of sodium hydride and 50 ml. of tetrahydrofuran is heated in a flask until all or substantially all of the starting compound is consumed as followed by thin layer chromatography. The reaction mixture is allowed to cool and is then diluted with ethanol and water and extracted with methylene chloride. The methylene chloride extracts are combined, washed, dried and evaporated to yield the methyl ester of 3-(8'-methoxy-1',6'-cyclodecapentaen-3'-yl)-2,2-dimethylbutyric acid (V; R is methoxy, $R^1$, $R^2$ and $R^3$ are methyl, $x$ is methylene).

(C) A mixture of 1 g. of the methyl ester obtained in Part B, 1 g. of sodium carbonate, 15 ml. of methanol and 2 ml. of water is allowed to stand for 24 hours. The reaction mixture is then acidified by the addition of dilute hydrochloric acid followed by extraction with methylene chloride. The methylene chloride extracts are combined, washed, dried and evaporated to give 3-(8'-methoxy-1',6'-methanocyclodecapentaen-3'-yl)-2,2 - dimethylbutyric acid (VI; R is methoxy, $R^1$, $R^2$ and $R^3$ are methyl, $x$ is methylene).

Part A of this example is repeated using 2-(8'-methoxy-1',6'-methanocyclodecapentaen - 3' - yl)butyric acid and 2-(1',6'-methanocyclodecapentaen-3'-yl)butyric acid as the starting material and there is obtained the methyl ester of 3-(8'-methoxy - 1',6' - methanocyclodecapentaen-3'-yl) pentanoic acid and the methyl ester of 3-(1',6'-methanocyclodecapentaen-3'-yl)pentanoic acid, respectively. These products are used as the starting material in Part B to afford the methyl ester of 3-(8'-methoxy-1',6'-methanocyclodecapentaen-3'-yl)-2,2-dimethylpentanoic acid and the methyl ester of 3-(1',6'-methanocyclodecapentaen-3'-yl)-2,2-dimethylpentanoic acid, respectively, which are hydrolyzed using the procedure of Part C to the free acids, that is, 3-(8'-methoxy-1',6'-methanocyclodecapentaen-3'-yl)-2,2-dimethylpentanoic acid (VI; R is methoxy, $R^1$ is ethyl, $R^2$ and $R^3$ are methyl, $x$ is methylene) and 3-(1',6'-methanocyclodecapentaen - 3' - yl)-2,2-dimethylpentanoic acid (VI; R is hydrogen, $R^1$ is ethyl, $R^2$ and $R^3$ are methyl, $x$ is methylene), respectively.

EXAMPLE 3

(A) A mixture of 2 g. of the methyl ester of 3-(8'-methoxy - 1',6' - methanocyclodecapentaen -3'- yl)butyric acid, one molar equivalent of methyl iodide and one molar equivalent of sodium hydride and 50 ml. of tetrahydrofuran is heated in a flask until all or substantially all of the starting compound is consumed as followed by thin layer chromatography. The reaction mixture is allowed to cool and is then diluted with ethanol and water followed by extraction with methylene chloride. The methylene chloride extracts are combined, washed, dried and evaporated to yield the methyl ester of 3-(8'-methoxy-1',6'-methanocyclodecapentaen - 3' - yl)-2-methylbutyric acid (IV; R is methoxy, $R^1$ and $R^2$ are methyl, $x$ is methylene) which is purified by chromatography.

(B) The procedure of Part A of this example is repeated using the product of Part A of this example as the starting material and substituting ethyl iodide in place of methyl iodide and there is obtained the methyl ester of 3-(8'-methoxy - 1',6' - methanocyclodecapentaen-3'-yl)-2-methyl-2-ethylbutyric acid (V; R is methoxy, $R^1$ and $R^2$ are methyl, $R^3$ is ethyl, $x$ is methylene) which is hydrolyzed to the corresponding free acid using the procedure of Example 2.

The procedure of Part A of this example is repeated using the methyl ester of 3-(8'-methoxy-1',6'-methanocyclodecapentaen-3'-yl)pentanoic acid as the starting material to afford the methyl ester of 3-(8'-methoxy-1',6'-methanocyclodecapentaen-3'-yl)-2 - methylpentanoic acid which is converted into the methyl ester of 3-(8'-methoxy-1',6'-methanocyclodecapentaen - 3' - yl)-2-methyl-2-ethylpentanoic acid and 3-(8'-methoxy-1',6'-methanocyclodecapentaen-3'-yl)-2-methyl-2-ethylpentanoic acid according to the procedure of Part B.

EXAMPLE 4

(A) A mixture of 1 g. of the methyl ester of 3-(8'-methoxy-1',6' - methanocyclodecapentaen - 3'-yl)-2,2-dimethylbutyric acid in 25 ml. of dry tetrahydrofuran is refluxed for about two hours with a slight molar excess of lithium aluminum hydride. The reaction mixture is allowed to cool and then diluted with water and ethyl acetate. The ethyl acetate layer is separated, washed, dried and evaporated to yield 3-(8'-methoxy-1',6'-methanocyclodecapentaen-3'-yl)-2,2-dimethylbutanol (VII; R is methoxy, $R^1$, $R^2$ and $R^3$ are methyl, $x$ is methylene).

(B) A mixture of 1 g. of the alcohol obtained in Part A of this example and 50 ml. of pyridine is added to a mixture of one molar equivalent of chromium trioxide in 20 ml. of pyridine. The reaction mixture is allowed to stand at room temperature for 15 hours and then diluted with ethyl acetate and filtered. The filtrate is washed well with dilute hydrochloric acid and water, dried and evaporated to yield 3-(8'-methoxy-1',6'-methanocyclodecapentaen-3'-yl) - 2,2 - dimethylbutanal (VIII; R is methoxy, $R^1$, $R^2$ and $R^3$ are methyl, $x$ is methylene).

By subjecting the methyl ester of 3-(8'-methoxy-1',6'-methanocyclodecapentaen - 3'-yl)-2,2-dimethylpentaonic acid, the methyl ester of 3-(1',6'-methanocyclodecapentaen-3'-yl)-2,2-dimethylpentanoic acid and the methyl ester of 3-(8'-methoxy-1',6'-methanocyclodecapentaen-3'-yl) - 2 - methyl - 2 - ethylpentanoic acid to the procedure of Part A of this example, there is obtained 3-(8'-methoxy - 1',6' - methanocyclodecapentaen-3'-yl)-2,2-dimethylpentanol, 3-(1',6'-methanocyclodecapentaen-3'-yl)-2,2-dimethylpentanol and 3-(8'-methoxy-1',6'-methanocyclodecapentaen-3'-yl)-2-methyl-2-ethylpentanol which are oxidized to the corresponding aldehyde using the procedure of Part B.

EXAMPLE 5

(A) To a solution of 1 g. of 3-(8'-methoxy-1',6'-methanocyclodecapentaen - 3' - yl) - 2,2 - dimethylpentanoic acid in 25 ml. of ethanol, there is added with stirring an aqueous solution of a molar equivalent of potassium bicarbonate. This mixture is stirred until the evolution of carbon dioxide ceases and then the mixture is evaporated to furnish the potassium salt of 3-(8'-methoxy-1',6'-methanocyclodecapentaen - 3' - yl)-2,2-dimethylpentanoic acid.

By using sodium bicarbonate in the above procedure, the corresponding sodium salt is obtained.

Alternatively, salts can be prepared by titrating a solution of a free acid (VI and XV) with an alcohol solution of an alkali metal alkoxide such as sodium methoxide, and the like, to neutrality.

(B) A mixture of 1 g. of the potassium salt of Part A of this example, 3 ml. of ethyl iodide and 20 ml. of dimethylacetamide is stirred in the dark for five hours. Excess ethyl iodide is removed by evaporation under reduced pressure. The mixture is then poured into water and extracted several times with ether. The ether extracts are combined, washed, dried and evaporated to yield the ethyl ester of 3-(8_-methoxy-1',6'-methanocyclodecapentaen-3'-yl)-2,2-dimethylpentanoic acid.

By using other lower alkyl iodides in place of ethyl iodide in this procedure, the corresponding lower alkyl esters are obtained.

Alternatively, the free acids can be converted into lower alkyl esters by treatment with a lower diazoalkane such as diazomethane, diazoethane, and the like, in ether for a few hours.

EXAMPLE 6

A mixture of 3 g. of the methyl ester of 3-(8'-methoxy-1',6'-methanocyclodecapentaen-3'-yl)-2,2 - dimethylpentanoic acid, one molar equivalent of sodium methoxide, one molar equivalent of hydroxylamine hydrochloride and 50 ml. of methanol is allowed to stand for about 16 hours. The mixture is then filtered and the filtrate evaporated. The residue is neutralized by the addition of aqueous 1 N hydrochloric acid and extracted with ether. The ether extracts are combined, washed with water, dried and evaporated to yield 3-(8'-methoxy-1',6'-methanocyclodecapentaen - 3' - yl) - 2,2 - dimethylvalerylhydroxamic acid (A; R is methoxy, $R^1$ is ethyl, $R^2$ and $R^3$ are methyl, $R^4$ is —CONHOH, $x$ is methylene).

EXAMPLE 7

(A) A solution of 1 g. of 3-(8'-methoxy-1',6'-methanocyclodecapentaen - 3' - yl) - 2,2 - dimethylpentanoic acid, 2 ml. of thionyl chloride in 20 ml. of benzene is held at reflux for about two hours. The reaction mixture is cooled and evaporated. The residue is dissolved in anhydrous dioxane and the solution saturated with a stream of anhydrous ammonia. Water is then added after about 20 hours and the mixture is evaporated under reduced pressure. The residue is taken up in methylene chloride, washed with water, dried and evaporated to give 3-(8'-methoxy - 1',6' - methanocyclodecapentaen-3'-yl)-2,2-dimethylpentanoic acid amide.

(B) A solution of 1 g. of 3-(8'-methoxy-1',6'-methanocyclodecapentaen - 3' - yl)) - 2,2 - dimethylpentanoic acid in 30 ml. of anhydrous methylene chloride is allowed to stand with 1 g. of N-(2-chloro-1,1,2-trifluoroethyl)diethylamine. The reaction mixture is heated at reflux for a period of five hours. The mixture is then poured into ice water and extracted with ether. The ether extracts are combined, dried and evaporated to dryness to yield 3-(8'-methoxy - 1',6' - methanocyclodecapentaen - 3' - yl)-2,2-dimethylpentanoic acid fluoride.

(C) A solution of 1 g. of 3-(8'-methoxy-1',6'-methanocyclodecapentaen - 3' - yl)-2,2-dimethylpentanoic acid in 20 ml. of carbon tetrachloride is allowed to react with 2 g. of triphenylphosphine. The reaction mixture is held at 25° C. for a period of 12 hours. The mixture is then poured into ice water and extracted with ether. The ether extracts are dried and evaporated to dryness to yield 3-(8' - methoxy - 1',6'-methanocyclodecapentaen-3'-yl)-2,2-dimethylpentanoic acid chloride.

EXAMPLE 8

A mixture of 1 g. of 3-(8'-methoxy-1',6'-methanocyclodecapentaen-3'-yl)-2,2-dimethylpentanol, 3 ml. of pyridine and 3 ml. of acetic anhydride is allowed to stand at room temperature for about 15 hours. The mixture is then poured into water and extracted with ethyl acetate. The ethyl acetate extracts are combined, washed with dilute hydrochloric acid and water, dried and evaporated to give the acetate of 3-(8'-methoxy-1',6'-methanocyclodecapentaen-3'-yl)-2,2-dimethylpentanol.

The acetate of 3-(1',6'-methanocyclodecapentaen-3'-yl)-2,2-dimethylpentanol is prepared from the corresponding free alcohol using the above procedure.

Similarly, by using an equivalent amount of other lower carboxylic anhydrides such as propionic anhydride, n-butyric anhydride, n-caproic anhydride, trimethylacetic anhydride, trichloroacetic anhydride, benzoic anhydride, and the like, in place of acetic anhydride, the corresponding esters are obtained.

EXAMPLE 9

A mixture of 1 g. of 3-(8'-methoxy-1',6'-methanocyclodecapentaen-3'-yl)-2,2-dimethylpentanol, 1 g. of sulfur trioxide trimethylamine complex and 40 ml. of pyridine is stirred at 40° C. for two and one-half days. The mixture is then poured into about 200 ml. of saturated sodium bicarbonate solution and extracted with ethyl acetate followed by extraction with n-butanol. The n-butanol extracts are combined, dried over sodium sulfate and evaporated under reduced pressure to yield a residue which is taken up in methanol and stirred for about 10 minutes with a carboxylic acid ion-exchange resin (Amberlite IRC–50, acid cycle). The mixture is filtered and the filtrate evaporated under reduced pressure to yield 3-(8'-methoxy - 1',6' - methanocyclodecapentaen - 3' - yl)-2,2-dimethylpentanol 1-sulfate monosodium salt.

EXAMPLE 10

A mixture of 2 g. of 3-(8'-methoxy-1',6'-methanocyclodecapentaen-3'-yl) - 2,2 - dimethylpentanol and 2 molar equivalents of β-cyanoethyl phosphate in pyridine is combined with pyridine solution of 8 molar equivalents of N,N'-dicyclohexylcarbodiimide and the reaction mixture is allowed to stand at room temperature for 24 hours. The reaction mixture is diluted with a small amount of water and allowed to stand at about 5° C. for two days. The mixture is then evaporated to dryness under reduced pressure and the residue taken up in about 35 ml. of aqueous methanol (1:1). This mixture is treated with about 12 ml. of 5% aqueous sodium hydroxide solution and after about one hour at room temperature, it is concentrated under reduced pressure, diluted with 30 ml. of aqueous methanol, concentrated and mixed with 75 ml. of water. This mixture is filtered and the filtrate is treated batchwise and then columnwise with an excess of a sulfonic acid ion-exchange resin (H+ form) to yield 3-(8'-methoxy - 1',6' - methanocyclodecapentaen - 3' - yl) - 2,2-dimethylpentanol 1-phosphate.

EXAMPLE 11

Two ml. of dihydropyran is added to a solution of 1 g. of 3 - (8'-methoxy-1',6'-methanocyclodecapentaen-3'-yl)-2,2-dimethylpentanol in 15 ml. of benzene. About 1 ml. is removed by distillation to remove moisture and 10 mg. of p-toluenesulfonic acid is added to the cooled solution. This mixture is allowed to stand at room temperature for four days, then washed with aqueous sodium carbonate solution and water, dried and evaporated. The residue is chromatographed on neutral alumina, eluting with hexane, to yield the tetrahydropyran-2"-yl ether of 3-(8'-methoxy - 1',6' - methanocyclodecapentaen - 3' - yl) - 2,2-dimethylpentanol.

By using dihydrofuran in place of dihydropyran in the above procedure, the corresponding tetrahydrofuran-2"-yl ether is obtained. Similarly, the use of 4-methoxy-5,6-dihydro-2H-pyran in the above procedure affords the corresponding 4"-methoxytetrahydropyran-4"-yl ether.

EXAMPLE 12

(A) A mixture of 1 g. of 2 - (8' - methoxy - 1',6'-oxidocyclodecapentaen-3'-yl)butanol in 5 ml. of pyridine and 0.3 g. of p-toluenesulfonyl chloride is allowed to stand at room temperature for 24 hours. The mixture is diluted with water and extracted with methylene chloride. The methylene chloride extracts are combined, washed, dried and evaporated to yield the p-toluenesulfonate of 2-(8'-methoxy-1',6'- oxidocyclodecapentaen-3'-yl)butanol.

(B) A mixture of 1 g. of the tosylate obtained in Part A, 5 molar equivalents of sodium iodide and 50 ml. of methyl ethyl ketone is refluxed until displacement is complete as followed by thin layer chromatography to yield 2 - (8' - methoxy - 1',6' - oxidocyclodecapentaen-3'-yl)butyl iodide (X; R' is methoxy, $R^1$ is ethyl).

(C) A mixture of 1 g. of the iodide in Part B, 50 ml. of tetrahydrofuran, 1 g. of magnesium and a crystal of iodine is heated to initiate formation of the Grignard (XI; R' is methoxy, R¹ is ethyl) and then allowed to stand to go to completion as checked by the disappearance of magnesium. There is then introduced 10 atmospheres of dry carbon dioxide and the mixture allowed to stand for 24 hours in a pressure vessel. The mixture is then diluted with water and extracted with ether. The organic extracts are washed with water, dried and evaporated under vacuum to yield 3-(8'-methoxy-1',6'-oxidocyclodecapentaen-3'-yl)-pentanoic acid (XII; R' is methoxy, R¹ is ethyl).

(D) A mixture of 1 g. of the tosylate of Part A, one molar equivalent of potassium cyanide and 25 ml. of dimethylformamide is refluxed until displacement is complete as followed by thin layer chromatography. The reaction mixture is allowed to cool and is then diluted with water and extracted with methylene chloride. The organic extracts are washed, dried and evaporated to give 2-(8'-methoxy-1',6'-oxidocyclodecapentaen-3'-yl)butyl cyanide (XIV; R' is methoxy, R¹ is ethyl).

Alternatively, the cyanide (XIV) can be obtained by treating the iodide of Part B with potassium cyanide or sodium cyanide.

(E) A mixture of 1 g. of the cyanide of Part D, 50 ml. of ethylene glycol, 5 ml. of water and 1 g. of potassium hydroxide is heated at about 125° C. for six hours. The mixture is allowed to cool and is then extracted with methylene chloride. The organic extracts are combined, washed, dried and evaporated under reduced pressure to yield 3-(8'-methoxy-1',6'-oxidocyclodecapentaen-3'-yl) pentanoic acid (XII; R' is methoxy, R is ethyl).

By repeating this example using 2-(1',6'-oxidocyclodecapentaen-3'-yl)butanol in place of 2-(8'-methoxy-1',6'-oxidocyclodecapentaen-3'-yl)butanol in place of 2-(8'-methoxy-1',6'-oxidocyclodecapentaen-3'-yl)butanol, there is obtained 3-(1',6'-oxidocyclodecapentaen-3'-yl)pentanoic acid.

EXAMPLE 13

By repeating the procedure of Example 5, 3-(8'-methoxy-1',6'-oxidocyclodecapentaen-3'-yl)pentanoic acid is converted into the corresponding methyl ester (XIII; R' is methoxy, R¹ is ethyl, R⁴' is methyl) which is alkylated using the procedure of Example 2 (Part B) to afford the methyl ester of 3-(8'-methoxy-1',6'-oxidocyclodecapentaen-3'-yl)-2,2-dimethylpentanoic acid (XIV; R' is methoxy, R¹ is ethyl, R², R³ and R⁴' are methyl).

A mixture of 1 g. of the methyl ester of 3-(8'-methoxy-1',6' - oxidocyclodecapentaen-3'-yl)-2,2-dimethylpentanoic acid, 1 g. of sodium carbonate, 15 ml. of methanol and 2 ml. of water is allowed to stand for 24 hours. The reaction mixture is then neutralized by the addition of acid ion-exchange resin and then extracted with methylene chloride. The methylene chloride extracts are combined, washed, dried and evaporated to afford 3-(8'-methoxy-1',6' - oxidocyclodecapentaen-3'-yl)-2,2-dimethylpentanoic acid.

EXAMPLE 14

By repeating the procedure of Example 4 (Part A), the methyl ester of 3-(8'-methoxy-1',6'-oxidocyclodecapentaen-3'-yl)-2,2-dimethylpentanoic acid is converted into 3 - (8'-methoxy-1',6'-oxidocyclodecapentaen-3'-yl)-2,2-dimethylpentanol.

To a substantially anhydrous solution of 1 g. of 3-(8'-methoxy - 1',6' - oxidocyclodecapentaen - 3' - yl) - 2,2-dimethylpentanol in 50 ml. of dimethylsulfoxide, there is added 0.5 molar equivalents of anhydrous orthophosphoric acid and 5 molar equivalents of anhydrous N,N'-dicyclohexylcarbodiimide. The reaction mixture is allowed to stand at room temperature for about 30 minutes. The reaction mixture is then concentrated by evaporation under reduced pressure and taken up in petroleum ether. This mixture is washed, dried and evaporated to give 3-(8' - methoxy - 1',6' - oxidocyclodecapentaen - 3' - yl)-2,2-dimethylpentanal (XVIII; R' is methoxy, R¹ is ethyl, R² and R³ are methyl).

EXAMPLE 15

The procedure of Example 1 is repeated using 2-(8'-acetoxy-1',6'-methanocyclodecapentaen-3'-yl)butyric acid and there is obtained 2-(8'-acetoxy-1',6'-methanocyclodecapentaen-3'-yl)butyric acid chloride which is processed acording to Example 2 to yield 3-(8'-acetoxy-1',6'-methanocyclodecapentaen-3'-yl) - 2,2-dimethylpentanoic acid. This acid is converted into the corresponding acid chloride using the procedure of Example 1.

To a cooled solution of 1 g. of 3-(8'-acetoxy-1',6'-methanocyclodecapentaen-3'-yl) - 2,2-dimethylpentanoic acid chloride and 75 ml. of tetrahydrofuran is added one molar equivalent of lithium tri-t-butoxy aluminum hydride and the mixture allowed to stand for about 12 hours at room temperature. The mixture is diluted with water, concentrated under vacuum and again diluted with water. This mixture is extracted with ethyl acetate and the ethyl acetate extracts are combined, washed, dried and evaporated to give 3-(8'-acetoxy-1',6'-methanocyclodecapentaen-3'-yl)-2,2-dimethylpentanal. The thus-obtained aldehyde is reduced using a molar equivalent of lithium tri-t-butoxy aluminum hydride in tetrahydrofuran to give 3-(8'-acetoxy - 1',6' - methanocyclodecapentaen-3'-yl)-2,2-dimethylpentanol.

EXAMPLE 16

Example 2 is repeated using 2-(8'-methoxy-1',6'-difluoromethylenecyclodecapentaen-3'-yl)butyric acid chloride, 2-(8' - methoxy-1',6'-methanocyclodecapentaen-3'-yl)-3-methylbutyric acid chloride, 2-(8'-methoxy-1',6'-dichloromethylenecyclodecapentaen-3'-yl)butyric acid chloride and 2-(1',6' - difluoromethylenecyclodecapentaen-3'-yl)butyric acid chloride in place of 2-(8'-methoxy-1',6'-methanocyclodecapentaen-3'-yl)propionic acid chloride, there is obtained as final products; 3-(8'-methoxy-1',6'-difluoromethylenecyclodecapentaen-3'-yl)-2,2-dimethylpentanoic acid, 3-(8'-methoxy - 1',6' - methanocyclodecapentaen-3'-yl)-2,2,4-trimethylpentanoic acid, 3-(8'-methoxy-1',6'-dichloromethylenecyclodecapentaen-3'-yl) - 2,2 - dimethylpentanoic acid and 3-(1',6'-difluoromethylenecyclodecapentaen-3'-yl)-2,2-dimethylpentanoic acid, respectively.

What is claimed is:

1. A compound selected from those of the formula:

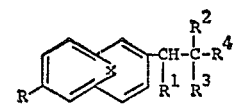

wherein,
R is hydrogen, lower carboxylic acyloxy or lower alkoxy;
each of R¹, R² and R³ is lower alkyl of one to three carbon atoms;
R⁴ is —COOR⁶ in which R⁶ is hydrogen, lower alkyl or an alkali metal; and
x is methylene, dichloromethylene or difluoromethylene.

2. A compound according to claim 1 wherein R is lower alkoxy, R¹ is ethyl and each of R² and R³ is methyl.

3. A compound according to claim 2 wherein R is methoxy and R⁴ is —COOR⁶ in which R⁶ is hydrogen.

4. A compound according to claim 2 wherein R is methoxy, R¹ is ethyl, each of R² and R³ is methyl, R⁴ is —COOR⁶ in which R⁶ is hydrogen and x is methylene.

5. A compound according to claim 1 wherein R is lower carboxylic acyloxy, $R^1$ is ethyl and each of $R^2$ and $R^3$ is methyl.

6. A compound according to claim 5 wherein R is acetoxy and $R^4$ is —$COOR^6$ in which $R^6$ is hydrogen.

7. A compound according to claim 6 wherein $x$ is methylene.

8. A compound according to claim 1 wherein R is hydrogen, $R^1$ is ethyl and each of $R^2$ and $R^3$ is methyl.

9. A compound according to claim 8 wherein $R^4$ is —$COOR^6$ in which $R^6$ is hydrogen.

10. A compound according to claim 9 wherein $x$ is methylene.

References Cited

Rautenstrauch et al., Agnew Chem. Inter. Fd. 7, 288 (1968).

LORRAINE A. WEINBERGER, Primary Examiner

R. GERSTL, Assistant Examiner

U.S. Cl. X.R.

260—950, 952, 953, 958; 425—278, 299, 315, 317 320, 333